United States Patent
Takase et al.

[11] Patent Number: 5,448,037
[45] Date of Patent: Sep. 5, 1995

[54] TRANSPARENT PANEL HEATER AND METHOD FOR MANUFACTURING SAME

[75] Inventors: Mitsuo Takase, Kamagaya; Nobuhiro Fukuda, Yokohama; Toshihiro Dodo, Chigasaki; Shin Fukuda, Yokohama, all of Japan

[73] Assignee: Mitsui Toatsu Chemicals, Inc., Tokyo, Japan

[21] Appl. No.: 99,445

[22] Filed: Jul. 30, 1993

[30] Foreign Application Priority Data

Aug. 3, 1992 [JP] Japan .................. 4-206542
Aug. 5, 1992 [JP] Japan .................. 4-208840
Jan. 27, 1993 [JP] Japan .................. 5-011535

[51] Int. Cl.6 ............................ H05B 3/16
[52] U.S. Cl. ......................... 219/547; 219/203
[58] Field of Search ........... 219/203, 209, 210, 522, 219/541, 547, 543

[56] References Cited

U.S. PATENT DOCUMENTS

| | | | |
|---|---|---|---|
| 2,507,036 | 5/1950 | McCrumm et al. | 219/203 |
| 2,640,904 | 6/1953 | Gaiser | 219/203 |
| 2,761,945 | 9/1956 | Colbert et al. | 219/543 |
| 2,932,710 | 4/1960 | Coale et al. | 219/547 |
| 3,623,906 | 11/1971 | Akeyoshi et al. | 219/203 |
| 4,010,304 | 3/1977 | Cohen | 219/203 |
| 4,876,178 | 10/1989 | Voss et al. | 219/203 |
| 4,952,783 | 8/1990 | Aufderheide et al. | 219/543 |
| 5,270,517 | 12/1993 | Finley | 219/203 |

*Primary Examiner*—Geoffrey S. Evans
*Attorney, Agent, or Firm*—Burns, Doane, Swecker & Mathis

[57] ABSTRACT

A transparent panel heater which can be used for heating a window portion of liquid crystal displays, refrigerated showcases, freezer showcases, defrosters of windshields, and the like. The panel heater has a transparent substrate, a transparent conductive film formed on the substrate, a substantially light-transmittable metallic thin layer formed on the conductive film and a pair of electrodes for electrifying the conductive film. The metallic thin layer is preferably deposited by a dry process such as a sputtering process, an ion plating method, various CVD methods, and the like. The electrodes are preferably formed on the metallic thin layer by a wet plating method.

20 Claims, 2 Drawing Sheets

TRANSPARENT PANEL HEATER AND METHOD FOR MANUFACTURING SAME

BACKGROUND OF THE INVENTION (i) Field of the Invention

The present invention relates to a transparent panel heater which can be used in a window portion. More particularly, it relates to a transparent panel heater which can be used in liquid crystal displays, refrigerated showcases, freezer showcases, defrosters for windshields, and the like.

(ii) Description of the Related Art

In a freezer showcase or a refrigerated showcase, it is necessary to prevent dew from condensing on the surface of a glass plate constituting its window. Therefore, a transparent conductive film has been formed on the glass surface, and predetermined electric power has been applied to the transparent conductive film to heat the glass surface.

In recent years, the demand of liquid crystal displays has increased, but when they are used in a cold environment, their operation is inconveniently slow. Thus, there has also been an increased need for transparent panel heaters for temperature control with liquid crystal displays.

Heretofore, in a liquid crystal display which can be used in a cold environment, a mesh-like heating resistor is disposed to heat it, as suggested in, for example, Japanese Patent Application Laid-open No. 126517/1983. In this constitution, however, it is difficult to uniformly heat the whole liquid crystal display, and the heating resistor comprising an opaque metal tends to inconveniently disturb an operator in watching the display.

A transparent heating element in which a transparent conductive film is formed on a transparent substrate has been suggested in, for example, U.S. Pat. No. 4,952,783. The constitution of such a heating element is shown in FIG. 1 attached hereto. That is, a transparent conductive film 52 is formed all over the surface of a transparent substrate 51, and a pair of electrodes 53 for feeding electric power to the transparent conductive film 52 are arranged at both the ends of the transparent conductive film 52. Furthermore, in order to protect the transparent conductive film 52 and the electrodes 53, a transparent protective layer 54 is formed all over the surface of the heating element. Here, the electrodes 53 are formed by applying a conductive printing material such as a silver paste on suitable positions of the transparent conductive film 52 by a screen printing method, and then thermally treating the applied coating material. For the purpose of improving the reliability of the electrodes, Japanese Patent Application Laid-open No. 289685/1992 discloses electrodes constituted by sandwiching a metal foil with electrically conductive printing material layers.

However, where the electrodes are constituted by an electrically conductive printing material such as the silver paste in this kind of transparent panel heater, the resistance of the conductive printing material itself is larger than that of the transparent conductive film, and the contact resistance between the electrodes and the transparent conductive film tends to increase. If the contact resistance increases, a conduction state in the transparent conductive film is uneven with the enlargement of the transparent panel heater. As a result, heat is unevenly generated, and the transparent panel heater is uniformly heated on the whole. In addition, current is concentrated in the vicinity of the contacts of the electrodes, so that portions of the transparent panel heater in the vicinity of the electrodes are abnormally heated and disconnection tends to inconveniently occur. In the case of such electrodes as disclosed in the above-mentioned Japanese Patent Application Laid-open No. 289685/1992, the unevenness of the conduction state can be solved, but adhesive properties between the transparent conductive film and the electrodes are poor and both of them are liable to peel from each other. In addition, a manufacturing process for the formation of such electrodes is intricate and their workability is low, which increases the cost of products.

SUMMARY OF THE INVENTION

An object of the present invention is to provide a transparent panel heater which has electrodes not using any conductive printing material and which permits improving a process for forming the electrodes on a transparent conductive film and which can be manufactured with a high productivity.

Another object of the present invention is to provide a method for manufacturing a transparent panel heater in which electrodes can be formed without using any conductive printing material and in which productivity can be improved.

The above-mentioned object of the present invention can be achieved by a transparent panel heater having, as a heating surface, a transparent conductive film formed on a transparent substrate and provided thereon a pair of electrodes for electrifying the transparent conductive film, said transparent panel heater being characterized in that the electrodes are constituted of a metal formed by a dry process followed by a wet process.

The above-mentioned object of the present invention can also be achieved by a transparent panel heater having, as a heating surface, a transparent conductive film formed on a transparent substrate and provided thereon a pair of electrodes for electrifying the transparent conductive film, said transparent panel heater being characterized in that a substantially light-transmittable metallic thin layer is formed on the transparent conductive film and the electrodes are formed on the metallic thin layer.

The above-mentioned other object of the present invention can be achieved by a method for manufacturing a transparent panel heater having, as a heating surface, a transparent conductive film formed on a transparent substrate and provided thereon a pair of electrodes for electrifying the transparent conductive film, said method comprising the steps of: forming metallic layers onto the portion of the transparent conductive film, where said pair of electrodes are to be formed by a dry process; depositing a metal on the metallic layers by electroplating to form the pair of electrodes; and forming a transparent protective layer on the transparent conductive film and the pair of electrodes.

The above-mentioned other object of the present invention can also be achieved by a method for manufacturing a transparent panel heater having, as a heating surface, a transparent conductive film formed on a transparent substrate and provided thereon a pair of electrodes for electrifying the transparent conductive film, said method comprising the steps of: depositing a metal or an alloy on the transparent conductive film on the transparent substrate by a dry process to form a substantially light-transmittable metallic thin layer;

forming a transparent protective layer onto the portion of the metallic thin layer, where said pair of electrodes are not to be formed; and forming the electrodes on the metallic thin layer by a wet plating method.

In the present invention, the dry process means a process for forming a film in a solution-free atmosphere, and examples of the dry process include physical deposition methods such as a vacuum deposition method, an ion plating method, a sputtering method and a molecular beam epitaxy (MBE) as well as chemical deposition methods such as a CVD method, an MOCVD method and a plasma CVD method. Furthermore, the wet process means a process for forming a film in a solution, and particularly, it denotes electroplating or electroless plating (chemical plating) which is wet plating.

As the transparent substrate which can be used in the present invention, there can be used a glass or a transparent plastic film having a light transmission of 70% or more, preferably 80% or more in a visible light range having a wavelength of from 400 nm to 800 nm. From the viewpoints of thinness, flexibility, impact resistance and continuous productivity, the plastic film can be preferably used as the transparent substrate.

Preferable examples of a material of the film constituting the transparent substrate include polyesters such as polyethylene terephthalate (PET) and polyethylene naphthalate (PEN), and homopolymers and copolymers of polyamide, polyether, polysulfone, polyethersulfone (PES), polycarbonate, polyarylate, polyether imide, polyether ether ketone (PEEK), polyimide, aramid and the like. The thickness of the plastic film which can be used as the transparent substrate is usually in the range of from 5 to 500 $\mu$m, preferably from 10 to 200 $\mu$m, more preferably from 50 to 150 $\mu$m.

As the transparent conductive film which can be used in the present invention, there can be used (1) compound semiconductors such as tin oxide and indium oxide, (2) a metallic thin film comprising a simple substance such as gold, silver, copper or palladium, or an alloy thereof, and (3) a laminate of a sandwiched structure of a metallic thin film comprising a simple substance such as gold, silver, copper or palladium, or an alloy thereof and a thin film having a high refractive index such as indium oxide or titanium oxide. From the viewpoints of transparency and conductivity, the laminate structure (3) is desirable, and a preferable example of the laminate is a silver thin film sandwiched with indium oxide or ITO (indium oxide+tin oxide). In this case, for the purpose of preventing the transparent conductive film from deteriorating owing to electrification, it is preferred to add a metal such as gold, copper or palladium to the silver thin film in such an amount as not to impair the conductivity and transparency. As a technique for forming the transparent conductive film on the transparent substrate, there can be utilized a known method such as a spray method, a coating method or a physical deposition method. Here, the physical deposition method is a technique for forming a thin film of a metal or the like under reduced pressure or under vacuum, and examples of the physical deposition method include a vacuum deposition method, a sputtering method, an ion plating method, an ion beam assisting deposition method and an ion cluster beam method.

As the metallic thin layer which can be used in the present invention, there can be used metals such as copper, nickel, palladium, chrominum, gold, silver, lead and platinum which can be used as usual materials for electrodes. Even if the electrodes are directly formed on the metallic thin layer, the panel heater having a sufficient performance can be obtained. However, in order to further improve electrical connecting properties and adhesive properties between the transparent conductive film and the electrodes, it is suitable that an alloy comprising an alkaline solution-soluble metal and an alkaline solution-insoluble metal or a mixed layer of these metals is formed on the transparent conductive film, and the thus formed alloy or layer is then treated with an alkaline solution to dissolve the alkaline solution-soluble metal, thereby forming the metallic thin layer with many pores. Examples of the alkaline solution-soluble metal include metals such as aluminum, zinc, tin and lead which are soluble in the aqueous alkaline solution, and examples of the alkaline solution-insoluble metal include copper, nickel, palladium, chrominum, gold and platinum. In a specific case, a complex is formed at the time of the above-mentioned dissolution, and therefore the metal for the formation of the metallic thin layer can be suitably selected. In this connection, the amount of the alkaline solution-insoluble metal is preferably 25 atom % or more.

Examples of a method for forming the metallic thin layer include a vacuum deposition method, an ion plating method, a sputtering method, a molecular beam epitaxy (MBE) method, a CVD method, an MOCVD method and a plasma CVD method, and a suitable method can be selected from these methods in consideration of a heat-resistant temperature of the transparent substrate and the like. The present inventors have found that there is the problem that the electrodes are easily delaminated during the manufacturing process of the transparent panel heater and during the use of the manufactured transparent panel heater, if the energy of deposited particles is excessively low, for example, less than 1 eV in the formation of the metallic thin layer. Therefore, examples of a more preferable method for forming the metallic thin layer include a sputtering process, an ion plating method, an ion beam assisting deposition method, an ion cluster beam method and an ion deposition thin film forming method.

The thickness of the metallic thin layer is suitably in the range of from 0.5 nm to 20 nm. If the thickness of the metallic thin layer is less than 0.5 nm, the thickness of the electrodes formed by a plating treatment are liable to become uneven. Furthermore, if it is more than 20 nm, visible light transmission noticeably deteriorates and light transmission of the transparent panel heater is impaired, which is unsuitable for the objects of the present invention.

The metallic thin layer is represented with "layer", but it is not always formed in the form of a uniform continuous layer on the transparent conductive film. The metallic thin layer may be formed in the form of dispersed islands or locally on the transparent conductive film.

The alkaline solution treatment in the present invention can be achieved by, for example, immersing the metallic thin layer for a period of from about 1 to about 10 minutes in an aqueous alkaline solution having a pH of from about 11 to about 13 in terms of a value measured by an ion meter such as a pH meter. Examples of such an aqueous alkaline solution include aqueous solutions of sodium hydroxide and potassium hydroxide, an aqueous ammonia solution and an amine. According to this treatment, the alkaline solution-soluble metal contained in the metallic thin layer is dissolved to form many pores in the metallic thin layer. After the treatment with the alkaline solution, the metallic thin layer is preferably washed with distilled water or the like prior to electroplating, In the present invention, as a first transparent protective layer, any protective layer is acceptable, so long as its light transmission at a wavelength of 550 nm is at least 70%, preferably 80% or more and it withstands the plating treatment. Examples of the first transparent protective layer include layers obtained by applying and then curing a known UV-setting resist ink, an electron beam-setting resist ink and a thermosetting resist ink, and a dry film. In addition, other materials can also be used as the first transparent protective layer, if they can provide water-resistant and chemical-resistant transparent films. For example, a transparent coating material, a plastic film such as a polyester onto which an adhesive is applied, or a self-adhesive film of an ethylene-vinyl acetate copolymer or the like can also be laminated as the first transparent protective layer. The thickness of the first transparent protective layer is usually in the range of from 1 to 100 $\mu$m, preferably from 5 to 50 $\mu$m, more preferably from 10 to 30 $\mu$m.

As a material for the electrodes which can be used in the present invention, any metal can be used, so long as it can be deposited by the plating. Nevertheless, from the viewpoints of electrical properties and durability, the electrodes preferably comprise a single layer of at least one metal selected from the group consisting of copper, silver, gold, chromium, tin, lead and solder; a single layer of an alloy of these metals; or a laminate thereof. The thickness of the electrodes should be such as to permit the flow of current under which the transparent conductive film can function as a heating surface, and it is preferably 0.5 $\mu$m or more.

Furthermore, for the sake of the mechanical protection of the electrodes and the first transparent protective layer as well as chemical protection from corrosion by moisture and the like, it is preferable to provide a second transparent protective layer so as to cover the electrodes and the first transparent protective layer. For the second transparent protective layer, there can be used a material in which the light transmission at a wavelength of 550 nm is at least 70%, preferably 80% or more. The second transparent protective layer can be formed by laminating the same kind of plastic film as the transparent substrate with the aid of an adhesive, or applying an organic material such as a polyester, a polyolefin or an acrylic resin, or a silicone-based hard coating material or a silica sol material. In the case that the plastic film is used as the second transparent protective layer, a usual transparent sticky agent or adhesive can be used. Preferable examples of the adhesive include acrylic pressure-sensitive adhesives and cyanoacrylate-based reactive adhesives. The thickness of the second transparent protective layer is usually in the range of from 1 to 200 $\mu$m, preferably from 2 to 100 $\mu$m, more preferably from 5 to 50 $\mu$m.

DETAILED DESCRIPTION OF PREFERRED EMBODIMENTS

Figure 1:
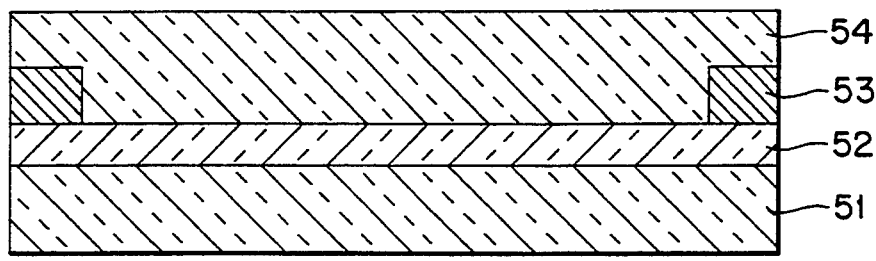
FIG. 1 is a sectional view of a conventional transparent panel heater.
Figure 2A:
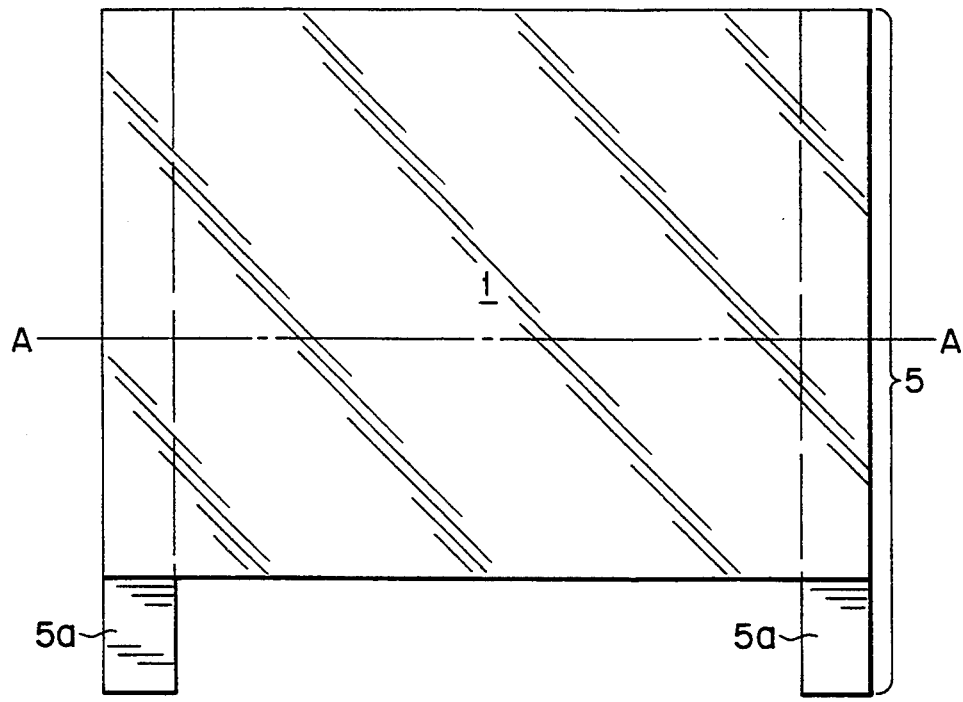
FIG. 2A is a plan view illustrating one embodiment of a transparent panel heater according to the present invention.
Figure 2B:
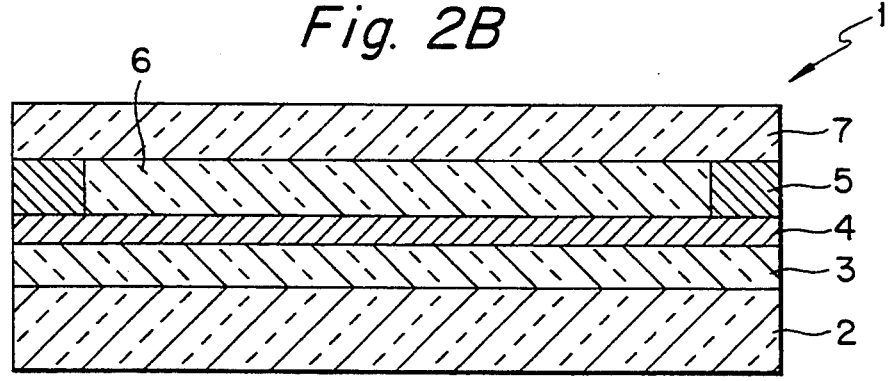
FIG. 2B is a sectional view along the A—A line in FIG. 2A.
Figure 2C:
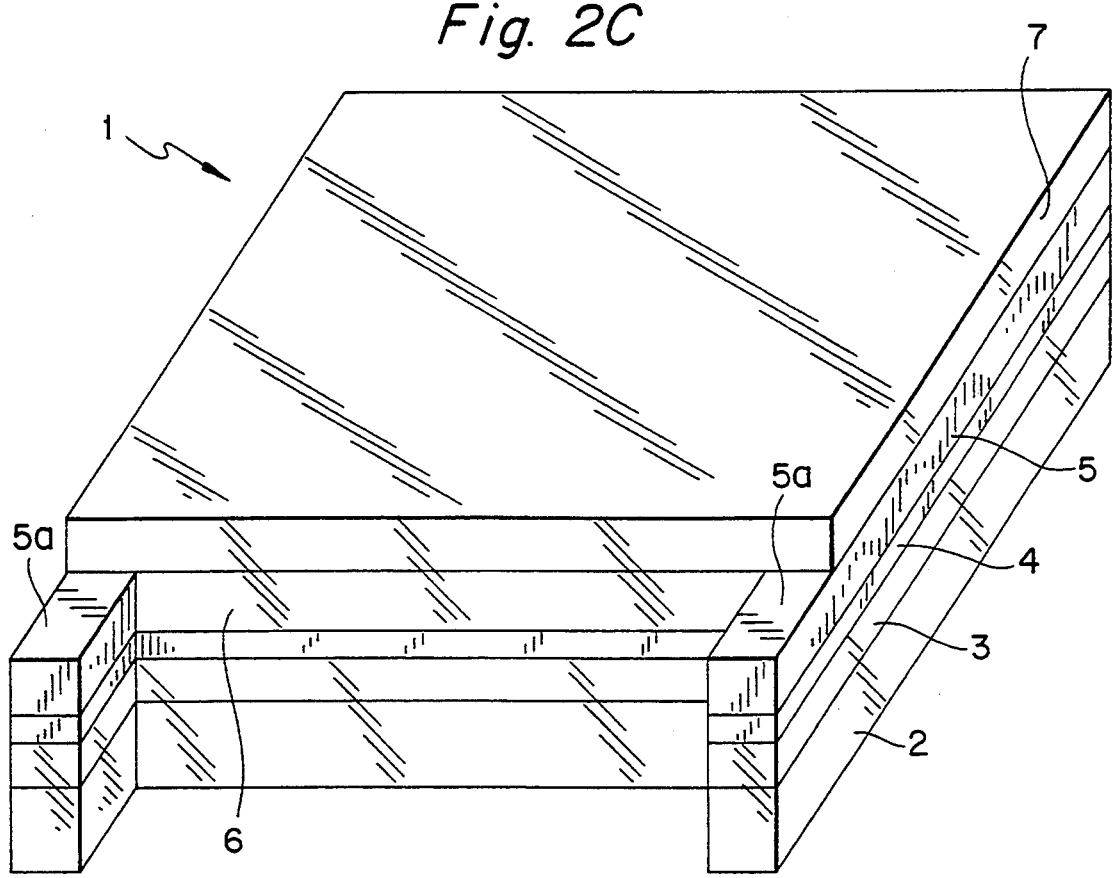
FIG. 2C is a perspective view of the transparent panel heater shown in FIG. 2A.

Now, the present invention will be described in detail. A transparent panel heater 1 shown in FIGS. 2A, 2B and 2C has the form of a substantially rectangular plate. This heater is constituted of a transparent substrate 2 made from a plastic or the like, a transparent conductive film 3 and a metallic thin layer 4 successively laminated on the surface of the transparent substrate 2, a pair of electrodes 5 which electrify the transparent conductive film 3 and which are arranged on the metallic thin layer 4 and at both the ends of the heater 1, a first protective layer 6 for covering the surface of the metallic thin layer 4 on which the electrodes 5 are not formed, and a second protective layer 7 for covering the electrodes 5 and the first transparent protective layer 6. The electrodes 5 have a long and narrow shape, and one end of each electrode constitutes a connecting portion 5a. The connecting portion 5a is a portion to which an electric wire for applying voltage to the electrode 5 is connected, and the second protective layer 7 is not disposed on the connecting portions 5a. As shown in FIGS. 2A and 2C, the connecting portions 5a are protruded from the heater 1 itself to a direction in its surface. The metallic thin layer 4 is formed on the transparent conductive film 3 by a method selected from dry processes which make it possible that the energy of deposited particles will be a specific value or more, preferably 1 eV or more. The thickness of the metallic thin layer 4 is, for example, from 0.5 to 20 nm. The electrodes 5 are formed on the surface of the metallic thin layer 4 by a method selected from wet processes such as electroless plating and electroplating, after the first transparent protective layer 6 is formed on the surface of the metallic thin layer 4 except positions where the electrodes 5 are formed. The second transparent protective layer 7, which is disposed for the mechanical and chemical protection of the electrodes 5 and the transparent conductive film 3, is made of a resin or a film having a visible light transmission of 70% or more.

According to the transparent panel heater of the present invention which is constituted as described above, electrode layers comprising a metal can be directly formed on a transparent conductive film without damaging the transparent conductive film, and therefore electrical connection between the electrodes and the transparent conductive film is good. In consequence, the connection resistance between both of them is low, so that performance as the heater is improved and reliability is also remarkably heightened. In order to further improve the electrical connection and the adhesive properties between the electrodes and the transparent conductive film, it is preferable to use, as a metallic thin layer, an alloy film having pores therein, which can be obtained by using an alloy of an alkaline solution-soluble metal and an alkaline solution-insoluble metal to form an alloy film, and then subjecting this alloy film to an alkaline treatment to form pores therein. After the formation of the metallic thin layer, the electrodes can be provided by plating. Furthermore, a first transparent protective layer determines positions where the electrodes should be formed, and protects the transparent conductive film, whereby operating efficiency at the time of the manufacture of the transparent panel heater can be remarkably enhanced.

Figure 3:
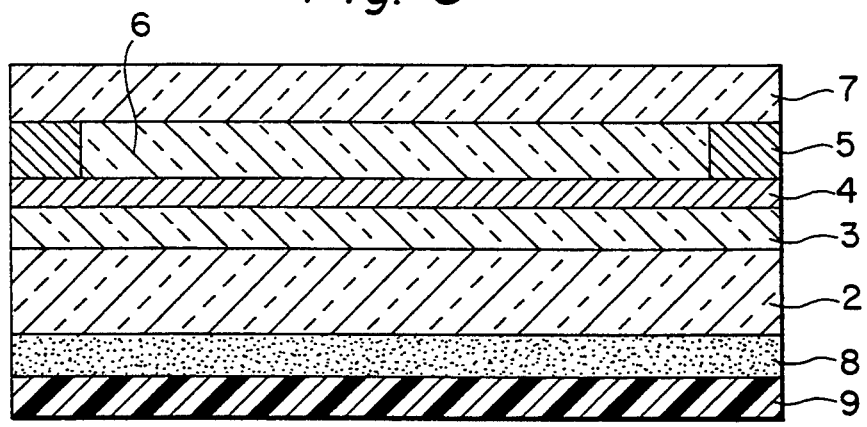
FIG. 3 is a sectional view illustrating another embodiment of the transparent panel heater according to the present invention.

Moreover, an adhesive layer 8 can be formed on the surface of the transparent substrate 2 on which the transparent conductive film 3 is not present. FIG. 3 shows a constitution in which the adhesive layer 8 and protective film 9 are provided. The protective film 9, which is usually made of PET or polyethylene film, covers the adhesive layer 8 for protection of the layer 8. This adhesive layer 8 is used to fix the transparent panel heater to another member. In some cases, the protective film 9 is not necessarily required. The protective film 9 will be peeled off when the heater is fixed to another member.

Next, the present invention will be described in reference to examples. However, the scope of the present invention should not be limited to these examples.

EXAMPLE 1

A laminated transparent conductive film comprising indium oxide ($In_2O_3$) (40 nm)/silver (13 nm)/indium oxide (40 nm) was formed on a polyethylene terephthalate (PET) film having a visible light transmission of 89% and a thickness of 100 μm by a DC magnetron sputtering process. Furthermore, a metallic thin layer comprising copper was deposited as thick as 2 nm all over the formed transparent conductive film by the DC magnetron sputtering process to form a laminate.

Onto the metallic thin layer of the thus obtained laminate except portions for the formation of electrodes, an ultraviolet (UV)-setting transparent resist ink was applied and then cured to form a first transparent protective layer. Afterward, electroplating was carried out in a nickel sulfamate plating bath at pH 4.5 to form nickel films having a thickness of 20 μm as electrodes. The size of the electrodes was 125 mm (length)×4 mm (width), and the distance between the electrodes was 90 mm. Next, a PET film having a thickness of 25 μm to which an adhesive layer having a thickness 20 μm was attached was laminated on the first transparent protective layer and the electrodes except the connecting portions of the electrodes, to form a second transparent protective layer. Thus, a transparent panel heater constituted as shown in FIGS. 2A to 2C was completed.

The resistance between both the electrodes of the thus obtained transparent panel heater was 4 Ω. This transparent panel heater was placed in a thermostatic tank at −20° C. and then allowed to stand. Afterward, an electric power of 13 V and 3.3 A was applied thereto, and as a result, the surface temperature of the transparent panel heater rose up to +2° C. in one minute. That is, a temperature rise of 22° C. took place.

EXAMPLE 2

A laminated transparent conductive film comprising titanium oxide ($TiO_2$) (30 nm)/silver (13 nm)/titanium oxide (30 nm) was formed on a PET film having a visible light transmission of 88% and a thickness of 100 μm by high-frequency ion plating. Furthermore, a metallic thin layer comprising palladium was deposited as thick as 2 nm all over the formed transparent conductive film by the high-frequency ion plating to obtain a laminate.

Onto the metallic thin layer of the thus obtained laminate except portions for the formation of electrodes, a thermosetting transparent resist ink was applied and then cured to form a first transparent protective layer. Afterward, electroplating was carried out in a nickel sulfamate plating bath at pH 4 to form nickel films having a thickness of 15 μm as electrodes. The size of the electrodes was 125 mm (length)×4 mm (width), and the distance between the electrodes was 90 mm. Next, a PET film (thickness=25 μm) to which a 20-μm-thick acrylic adhesive layer having a hard coating layer was attached was laminated on the first transparent protective layer and the electrodes except the connecting portions of the electrodes, to form a second transparent protective layer. Thus, a transparent panel heater constituted as shown in FIGS. 2A to 2C was completed.

The resistance between both the electrodes of the thus formed transparent panel heater was 5 Ω. This transparent panel heater was placed in a thermostatic tank at −20° C. and then allowed to stand. Afterward, an electric power of 13 V and 2.6 A was applied thereto, and as a result, the surface temperature of the transparent panel heater rose up to +3° C. in one minute.

EXAMPLE 3

A transparent conductive film comprising a laminate of indium oxide (40 nm)/silver (13 nm)/indium oxide (40 nm) was formed on a PET film having a visible light transmission of 89% and a thickness of 100 μm by a DC magnetron sputtering process. Furthermore, a metallic thin layer comprising copper was deposited as thick as 1 nm all over the formed transparent conductive film by the DC magnetron sputtering process.

Next, the thus obtained laminate was cut into a size of 115 mm (length)×90 mm (width), and onto the surface of the cut laminate except portions for the formation of both electrodes each having a width of 4 mm, a UV-setting acrylic resin resist ink was applied and then cured to form a first transparent protective layer. Afterward, plating was carried out in an electroless copper plating bath at pH 12 to form copper films having a thickness of 0.1 μm, and then in an electroless nickel plating bath at pH 6 to form nickel films having a thickness of 1 μm. Furthermore, electroplating was carried out by the use of the formed nickel films as electrodes for the plating to form copper films having a thickness of 15 μm, thereby forming the electrodes for a heater. Next, a PET film having a thickness of 25 μm was laminated via an epoxy adhesive layer having a thickness 5 μm on the first transparent protective layer and the electrodes except the connecting portions of the electrodes, to form a second transparent protective layer. Thus, a transparent panel heater constituted as shown in FIGS. 2A to 2C was completed.

The resistance between both the electrodes of the thus obtained transparent panel heater was 4 Ω. This transparent panel heater was placed in a thermostatic tank at −20° C. and then allowed to stand. Afterward, an electric power of 13 V and 3.3 A was applied thereto, and as a result, the surface temperature of the transparent panel heater rose up to +2° C. in one minute.

EXAMPLE 4

A transparent conductive film comprising a laminate of titanium oxide (30 nm)/silver (13 nm)/indium oxide (40 nm) was formed on a PET film having a visible light transmission of 89% and a thickness of 100 μm by an RF magnetron sputtering process. Furthermore, a metallic thin layer comprising palladium was deposited as thick as 1.5 nm all over the formed transparent conductive film by the RF magnetron sputtering process.

Next, the thus obtained laminate was cut into a size of 125 mm (length)×90 mm (width), and onto the surface of the cut laminate except portions for the formation of electrodes, a thermosetting transparent polyesteracylate resin was applied and then cured to form a first transparent protective layer. Afterward, plating was carried out in an electroless copper plating bath at pH 10 to form copper films having a thickness of 0.1 $\mu$m, and then in an electroless nickel plating bath at pH 4 to form nickel films having a thickness of 1 $\mu$m. Furthermore, electroplating was carried out in a copper sulfate solution by the use of the formed nickel films as electrodes for the plating to form copper films having a thickness of 20 $\mu$m, thereby forming the electrodes. Next, a PET film having a thickness of 25 $\mu$m was laminated via a 5-$\mu$m-thick epoxy adhesive layer having a hard coating layer on the first transparent protective layer and the electrodes except the connecting portions of the electrodes, to form a second transparent protective layer. Thus, a transparent panel heater constituted as shown in FIGS. 2A to 2C was completed.

The resistance between both the electrodes of the thus obtained transparent panel heater was 5 $\Omega$. This transparent panel heater was placed in a thermostatic tank at $-20°$ C. and then allowed to stand. Afterward, an electric power of 13 V and 2.6 A was applied thereto, and as a result, the surface temperature of the transparent panel heater rose up to $+2°$ C. in one minute.

EXAMPLE 5

A transparent conductive film comprising a laminate of indium oxide (40 nm)/silver (15 nm)/indium oxide (40 nm) was formed on a polyether sulfone (PES) film having a visible light transmission of 89% and a thickness of 50 $\mu$m by a DC magnetron sputtering process. Furthermore, a metallic thin layer comprising copper was deposited as thick as 2 nm all over the formed transparent conductive film by the DC magnetron sputtering process.

Next, the thus obtained laminate was cut into a size of 200 mm (length)×90 mm (width), and onto the surface of the cut laminate except portions for the formation of electrodes for input having a width of 4 mm, a UV-setting transparent resist ink was applied and then cured to form a first transparent protective layer. Afterward, plating was carried out in an electroless copper plating bath at pH 12 to form copper films having a thickness of 0.1 $\mu$m, and then in an electroless nickel plating bath at pH 6 to form nickel films having a thickness of 1 $\mu$m on the copper films. Furthermore, electroplating was carried out by the use of the formed nickel films as plating electrodes in a copper sulfate solution to form copper films having a thickness of 20 $\mu$m as the electrodes. Next, a UV-setting acrylic resin was applied and then cured as thick as 20 $\mu$m on the first transparent protective layer and the electrodes except the connecting portions of the electrodes, to form a second transparent protective layer. Thus, a transparent panel heater was completed.

The resistance between both the electrodes of the completed transparent panel heater was 3 $\Omega$. This transparent panel heater was placed in a thermostatic tank at $-20°$ C. and then allowed to stand. Afterward, an electric power of 13 V and 4.2 A was applied thereto, and as a result, the surface temperature of the transparent panel heater rose up to $+20°$ C. in one minute.

EXAMPLE 6

A transparent conductive film comprising a laminated film of indium oxide (40 nm)/silver (13 nm)/indium oxide (40 nm) was formed on a PET film having a visible light transmission of 89% and a thickness of 100 $\mu$m by a DC magnetron sputtering process. Furthermore, a metallic thin layer comprising copper (50%)-aluminum (50%) was deposited as thick as 2 nm all over the transparent conductive film by the DC magnetron sputtering process.

Next, the thus obtained laminate was treated with an aqueous sodium hydroxide solution having a pH of 11 for 3 minutes to form many pores therein, followed by washing with distilled water and then drying. Afterward, onto the surface of the treated laminate except portions for the formation of electrodes, a UV-setting transparent resist ink was applied and then cured to form a first transparent protective layer. Next, electroplating was carried out in a nickel sulfamate plating bath at pH 4.5 to form nickel films having a thickness of 20 $\mu$m as electrodes. The size of the electrodes was 125 mm (length)×4 mm (width), and the distance between the electrodes was 90 mm. Furthermore, a PET film having a thickness of 25 $\mu$m to which an adhesive layer having a thickness 20 $\mu$m was attached was laminated on the first transparent protective layer and the electrodes except the connecting portions of the electrodes, to form a second transparent protective layer. Thus, a transparent panel heater was completed.

The resistance between both the electrodes of the thus obtained transparent panel heater was 4 $\Omega$. This transparent panel heater was placed in a thermostatic tank at $-20°$ C. and then allowed to stand. Afterward, an electric power of 13 V and 3.3 A was applied thereto, and as a result, the surface temperature of the transparent panel heater rose up to $+2°$ C. in one minute.

EXAMPLE 7

A laminated transparent conductive film comprising titanium oxide (30 nm)/silver (13 nm)/titanium oxide (30 nm) was formed on a PET film having a visible light transmission of 89% and a thickness of 100 $\mu$m by high-frequency ion plating. Furthermore, a surface-treated metal comprising palladium ( 25% )-zinc (75%) was deposited as thick as 4 nm all over the formed transparent conductive film by the same plating.

The thus obtained laminate was treated with an aqueous sodium hydroxide solution having a pH of 13 for 2 minutes, followed by washing with distilled water and then drying. Next, onto the surface of the treated laminate except portions for the formation of electrodes, a thermo-setting transparent resist ink was applied and then cured to form a first transparent protective layer. Afterward, electroplating was carried out in a nickel sulfamate plating bath at pH 4 to form nickel films having a thickness of 15 $\mu$m as electrodes. The size of the electrodes was 125 mm (length)×4 mm (width), and the distance between the electrodes was 90 mm. Furthermore, a PET film (thickness=25 $\mu$m) to which a 20-$\mu$m-thick acrylic adhesive layer having a hard coating layer was attached was laminated on the first transparent protective layer and the electrodes except the connecting portions of the electrodes, to form a second transparent protective layer. Thus, a transparent panel heater was completed.

The resistance between both the electrodes of the thus obtained transparent panel heater was 5 $\Omega$. This transparent panel heater was placed in a thermostatic tank at $-20°$ C. and then allowed to stand. Afterward, an electric power of 13 V and 2.6 A was applied thereto, and as a result, the surface temperature of the transparent panel heater rose up to $+1°$ C. in one minute.

EXAMPLE 8

A transparent conductive film comprising a laminated film of indium oxide (40 nm)/silver+gold (3 wt %) (15 nm)/indium oxide (40 nm) was formed on a PES film having a visible light transmission of 89% and a thickness of 50 μm by a DC magnetron sputtering process. Furthermore, a metallic thin layer comprising copper (50%)-aluminum (50%) was deposited as thick as 2 nm all over the transparent conductive film by the DC magnetron sputtering process.

Next, the thus obtained laminate was treated with an aqueous sodium hydroxide solution at pH 13 for 2 minutes, followed by washing with distilled water and then drying. Afterward, onto the surface of the treated laminate except portions for the formation of electrodes, a UV-setting acrylic resist ink was applied and then cured to form a first transparent protective layer. Next, electroplating was carried out in a nickel sulfamate plating bath at pH 4 to form nickel films having a thickness of 20 μm as electrodes. The size of the electrodes was 35 mm (length)×4 mm (width), and the distance between the electrodes was 90 mm. Furthermore, an acrylic urethane resin layer was laminated on the first transparent protective layer and the electrodes except the connecting portions of the electrodes, to form a second transparent protective layer.

The resistance between both the electrodes of the thus completed transparent panel heater was 5 Ω. This transparent panel heater was placed in a thermostatic tank at −20° C. and then allowed to stand. Afterward, an electric power of 12 V and 2.4 A was applied thereto, and as a result, the surface temperature of the transparent panel heater rose up to +4° C. in one minute.

EXAMPLE 9

A transparent conductive film comprising indium oxide (40 nm)/silver (13 nm)/indium oxide (40 nm) was formed on a PET film having a visible light transmission of 89% and a thickness of 100 μm by a DC magnetron sputtering process. Furthermore, a metallic thin layer comprising copper was deposited as thick as 2 nm all over the formed transparent conductive film by the DC magnetron sputtering process.

Next, onto the surface of the thus obtained laminate except portions for the formation of electrodes, a UV-setting transparent urethane acrylate resin was applied and then cured to form a first transparent protective layer. Afterward, electroplating was carried out in an alkanolsulfonic acid bath to form solder layers as electrodes comprising an about 10-μm-thick tin-lead alloy. The size of the electrodes was 125 mm (length)×4 mm (width), and the distance between the electrodes was 90 mm. Next, a PET film having a thickness of 50 μm to which a 20-μm-thick adhesive layer was attached was laminated on the first transparent protective layer and the electrodes except the connecting portions of the electrodes, to form a second transparent protective layer.

The resistance between both the electrodes of the thus completed transparent panel heater was 4 Ω. This transparent panel heater was placed in a thermostatic tank at −20° C. and then allowed to stand. Afterward, an electric power of 13 V and 3.3 A was applied thereto, and as a result, the surface temperature of the transparent panel heater rose up to +4° C. in one minute.

EXAMPLE 10

A transparent conductive film comprising indium oxide +5 wt % tin oxide (ITO) (thickness=400 nm) was formed on a PET film having a visible light transmission of 88% and a thickness of 100 μm by a DC magnetron sputtering process. Furthermore, a metallic thin layer comprising nickel was deposited as thick as 2 nm all over the formed transparent conductive film by the DC magnetron sputtering process to obtain a laminate.

Next, onto the surface of the thus obtained laminate except portions for the formation of electrodes, a UV-setting transparent resist ink was applied and then cured to form a first transparent protective layer. Afterward, electroplating was carried out in an alkanolsulfonic acid bath to form about 5-μm-thick solder layers as electrodes comprising a tin-lead alloy. The size of the electrodes was 125 mm (length)×4 mm (width), and the distance between the electrodes was 90 mm. Next, a 50-μm-thick PET film having a hard coating layer was laminated on the first transparent protective layer and the electrodes except the connecting portions of the electrodes, to form a second transparent protective layer.

The resistance between both the electrodes of the thus completed transparent panel heater was 7 Ω. This transparent panel heater was placed in a thermostatic tank at −20° C. and then allowed to stand. Afterward, an electric power of 13 V and 1.9 A was applied thereto, and as a result, a temperature rise of 15° C. in one minute took place.

Comparative Example 1

A conductive coating material (a silver paste) was applied onto both ends of a transparent conductive film over a width of 4 mm on a PET film having the same size and the same constitution as in Example 1 to form electrodes of a transparent panel heater. Afterward, a temperature rise test was carried out by applying electric power thereto. As a result, heat was abnormally generated from a portion of the transparent conductive film in the vicinity of the electrodes of the transparent panel heater, and disconnection occurred.

Comparative Example 2

The same procedure as in Example 1 was carried out except that any metallic thin layer was not formed on a transparent conductive film on a PET film having the same size and the same constitution as in Example 1, to obtain a transparent panel heater having electrodes comprising nickel. The resistance between the electrodes of this transparent panel heater was 10 Ω. The electrodes comprising nickel which were formed by electroplating were easily peeled from the transparent conductive film.

As is apparent from the above-mentioned examples and comparative examples, according to the present invention, a manufacturing process can be improved, and a transparent panel heater having high reliability can be manufactured.

What is claimed is:

1. A transparent panel heater having, as a heating surface, a transparent conductive film formed on a transparent substrate and provided thereon a pair of electrodes for electrifying said transparent conductive film, said transparent panel heater being characterized in that said electrodes are constituted of a metal formed by a wet process on a metallic thin layer formed by a dry process.

2. A transparent panel heater having, as a heating surface, a transparent conductive film formed on a transparent substrate and provided thereon a pair of electrodes for electrifying said transparent conductive film,
said transparent panel heater being characterized in that a substantially light-transmittable metallic thin layer is formed on said transparent conductive film and said electrodes are formed on said metallic thin layer.

3. The transparent panel heater according to claim 2 further comprises having a first transparent protective layer covering a portion of said metallic thin layer between said electrodes, and a second protective layer covering said electrodes and said first transparent protective layer.

4. The transparent panel heater according to claim 3 wherein said metallic thin layer comprises at least one metal or an alloy selected from the group consisting of copper, nickel, chrominum, palladium, lead, platinum, gold and silver, or an alloy thereof.

5. The transparent panel heater according to claim 3 wherein said electrodes comprise at least one metal or an alloy selected from the group consisting of copper, nickel, chromium, gold, tin, lead, silver and solder, or an alloy thereof.

6. The transparent panel heater according to claim 3 wherein said metallic thin layer is a metallic layer having a thickness of from 0.5 to 20 nm formed on said transparent conductive film by a dry process.

7. The transparent panel heater according to claim 3 wherein the thickness of said electrodes is 0.5 $\mu$m or more.

8. The transparent panel heater according to claim 3 wherein said second protective layer and/or said transparent substrate is further provided with an adhesive layer.

9. A method for manufacturing a transparent panel heater having, as a heating surface, a transparent conductive film formed on a transparent substrate and provided thereon a pair of electrodes for electrifying said transparent conductive film,
said method comprises the steps of: forming metallic layers onto the portions of said transparent conductive film, where said electrodes are to be formed, by a dry process; depositing a metal on said metallic layers by electroplating to form said pair of electrodes; and forming a transparent protective layer on said transparent conductive film and said pair of electrodes.

10. A method for manufacturing a transparent panel heater having, as a heating surface, a transparent conductive film formed on a transparent substrate and provided thereon a pair of electrodes for electrifying said transparent conductive film,
said method comprises the steps of: depositing a metal or an alloy on said transparent conductive film on said transparent substrate by a dry process to form a substantially light-transmittable metallic thin layer; forming a transparent protective layer onto the portion of said metallic thin layer, where said pair of electrodes are not to be formed; and forming said electrodes on said metallic thin layer by a wet plating method.

11. The method for manufacturing a transparent panel heater according to claim 10 wherein the thickness of said metallic thin layer is in the range of from 0.5 to 20 nm.

12. The method for manufacturing a transparent panel heater according to claim 10 wherein in the electrode forming step, said electrodes are formed in the form of a single layer or a multiple layer having a thickness of 0.5 $\mu$m or more.

13. The method for manufacturing a transparent panel heater according to claim 10 wherein said wet plating method is an electroplating method.

14. The method for manufacturing a transparent panel heater according to claim 10 wherein said wet plating method is an electroless plating method.

15. The method for manufacturing a transparent panel heater according to claim 10 wherein in the electrode forming step, said electrodes are formed by an electroplating method and an electroless plating method.

16. The method for manufacturing a transparent panel heater according to claim 10 wherein said protective layer forming step is achieved by coating any one of an ultraviolet-setting resist ink, an electron beam-setting resist ink and a thermosetting resist ink.

17. The method for manufacturing a transparent panel heater according to claim 10 wherein said protective layer forming step is achieved by laminating a transparent film with an adhesive layer.

18. The method for manufacturing a transparent panel heater according to claim 10 wherein said protective layer forming step is achieved by laminating a dry resist film.

19. The method for manufacturing a transparent panel heater according to claim 10 wherein said protective layer forming step is achieved by a coating method.

20. The method for manufacturing a transparent panel heater according to claim 11 wherein said metallic thin layer comprises an alloy of an alkaline solution-soluble metal and an alkaline solution-insoluble metal, and before said protective layer forming step, an alkaline solution treatment of the metallic thin layer is carried out.

* * * * *